(No Model.)
W. KERR.
FLEXIBLE AND CORRUGATED JOINT FOR COUPLINGS FOR WATER PIPES.
No. 550,047. Patented Nov. 19, 1895.
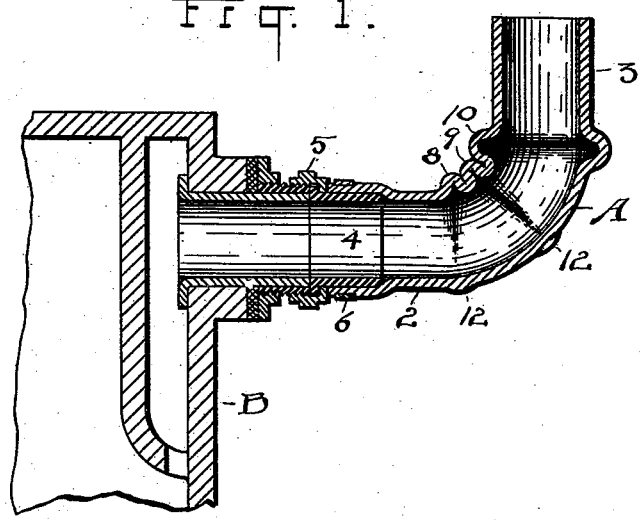
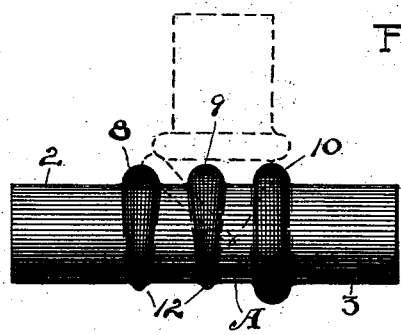
ATTEST  
N. S. B. Moser  
G. L. Scharffer  
INVENTOR  
By William Kerr  
H. J. Fisher  
ATTORNEY

UNITED STATES PATENT OFFICE.

WILLIAM KERR, OF CLEVELAND, OHIO.

FLEXIBLE AND CORRUGATED JOINT FOR COUPLINGS FOR WATER-PIPES.

SPECIFICATION forming part of Letters Patent No. 550,047, dated November 19, 1895.

Application filed November 24, 1894. Serial No. 529,797. (No model.)

*To all whom it may concern:*

Be it known that I, WILLIAM KERR, a citizens of the United States, residing at Cleveland, in the county of Cuyahoga and State of Ohio, have invented certain new and useful Improvements in Flexible and Corrugated Joints for Couplings for Water-Pipes; and I do hereby declare that the following is a full, clear, and exact description of the invention, which will enable others skilled in the art to which it appertains to make and use the same.

My invention relates to flexible and corrugated joints or couplings for water-pipes, and is intended for use wherever connections more or less at an angle to one another are to be made.

In setting water-closets, basins, sinks, and other vessels where permanent water connections are employed, it is found that the conditions of different places vary so widely that a wide range of adaptability in the coupling is needed if a single form of coupling is to be made available for each and every connection as it is reached and regardless of its peculiar character. Thus the pipes which are to be connected are seldom the same distance apart, and still less seldom at the same angle to each other. In some instances they may even be in parallel lines, and again they may be at exactly right angles or even at somewhat greater angle, or, again, much less than a right angle. Just what the relation and need may be cannot be known at the shop, and the plumber must go to the place and be prepared with what he takes along to make the necessary coupling. Obviously no rigid coupling, of whatever material, would serve his purpose, because it would be adapted to only one relation of parts and none other. Hence, also, it follows that the coupling which shall be of universal use must not only be flexible, but adaptable in its flexibility to different positions and relations and in them all to always carry the full volume of water and afford a full and free and unobstructed passage. To meet this need I have conceived and produced the invention herein shown and described, which comprises a rubber coupling or joint provided with two or more corrugations or ribs and adapted to be bent to form an elbow of more or less angle without diminishing the volume or flow of the water and without strain or injury to the joint, and which enables a speedy and easy mechanical connection at its ends to be effected, all substantially as shown and described, and particularly pointed out in the claim.

In the accompanying drawings, Figure 1 is a vertical sectional elevation of a back section of a water-closet and showing the pipe connections, including my improvement in central longitudinal elevation. Fig. 2 is a side elevation of my improved joint or coupling alone. In this view it is shown in full lines as straight and in dotted lines as it appears when bent at right angles.

It will be understood that while I have here shown one relation and use of my new and improved joint there are many others in which it may be used, and the invention consists in the joint or coupling itself as an article of manufacture rather than in a combination of elements in which it is comprised, though it is found in both. As shown, the said coupling or joint A is constructed at one end with what may be termed a "neck" 2, and at the other end with a neck 3. It is intended that these necks shall be somewhat longer than the average condition or setting will require, so that, if necessary, a part, (more or less,) of either or both can be cut off. The coupling at end 2 is shown here as being completed by introducing the sleeve 4, which is engaged by the coupling-nut 5, and the connection is then made with the bowl B of the water-closet by the means substantially as here shown, or any other suitable means, the special connections not being important to this invention. Leakage about the joint 2 is prevented by a suitable clamp 6, which engages it over the sleeve. At its opposite end the joint may be made by means substantially shown here in connection with the bowl B or other convenient means.

Intermediate of the ends or necks 2 and 3 are the corrugations or ribs 8, 9, and 10. The ribs 8 and 9 are alike, and, if preferred, another like these may be added. These two ribs are deepest at their middle and taper thence to the point 12, directly opposite their middle, where they nearly run out. On their inside the said ribs or corrugations form an annular channel or groove and their walls are of the same thickness as the remainder of the coupling. The same is true of the rib 10, except that this rib belts the coupling at a uniform depth all around. This enables me to make a deflection or bend of the end 3 equal to the yield of the said rib 10 in any direction, even in the opposite direction to the dotted lines in Fig. 2, if that were desirable, or at any time necessary.

In some instances I furnish the sleeve 4 and the nut 5 with the joint A, because it is necessary that these parts should match each other, and the coupling means at both ends may be the same and both be furnished with the joint, if desired.

Having thus described my invention, what I claim as new, and desire to secure by Letters Patent, is—

As a new article of manufacture, a pipe section for water pipe connections composed of elastic material, like india rubber, and formed with a plurality of compressible corrugations or ribs at about its middle, said corrugations deepest in the inner angle of the bend and tapering in both directions from the deepest point, substantially as set forth.

Witness my hand to the foregoing specification this 10th day of November, 1894.

WILLIAM KERR.

Witnesses:
H. T. FISHER,
R. B. MOSER.